Figure 1:
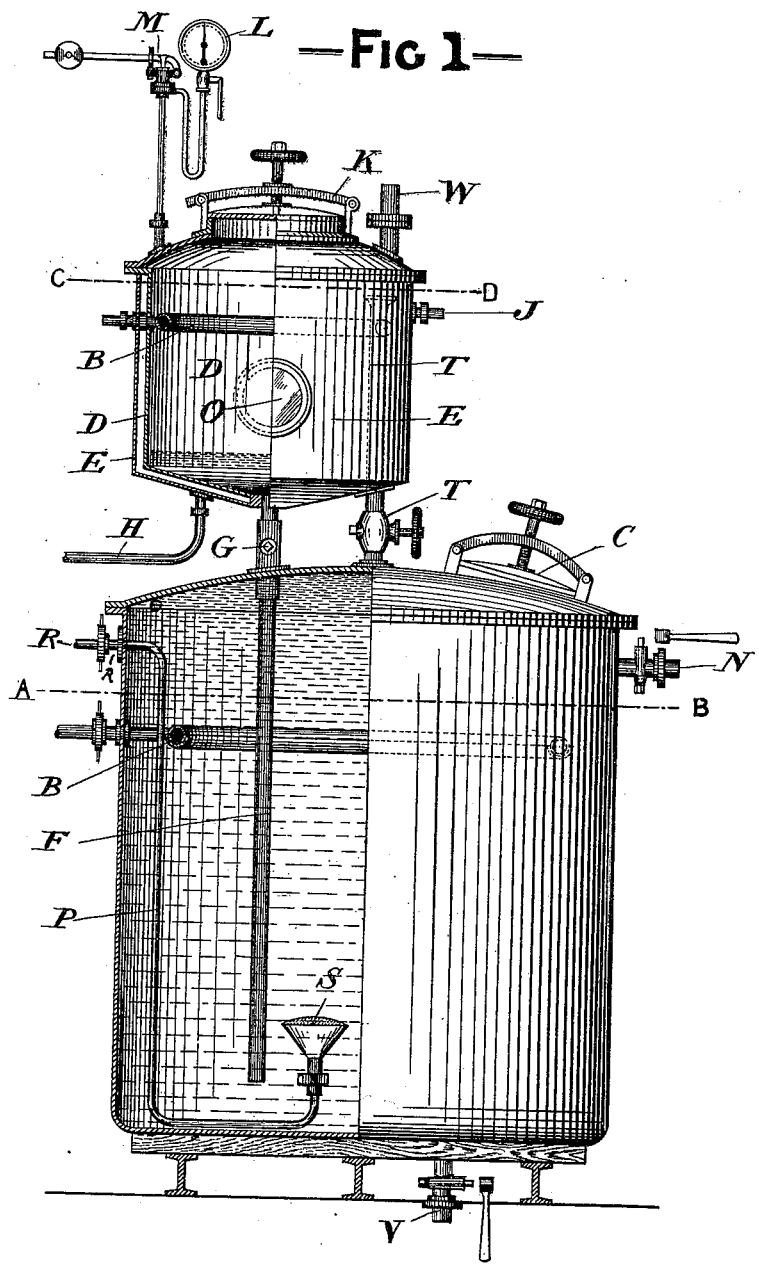

No. 653,387.

A. D. W. KING.

APPARATUS FOR TOP FERMENTATION OF BEERS NOT IN VACUO.

(Application filed Dec. 5, 1899.)

Patented July 10, 1900.

(No Model.)

3 Sheets—Sheet 1.

No. 653,387.  
A. D. W. KING.  
APPARATUS FOR TOP FERMENTATION OF BEERS NOT IN VACUO.  
(Application filed Dec. 5, 1899.)  
(No Model.)  
Patented July 10, 1900.  
3 Sheets—Sheet 2.
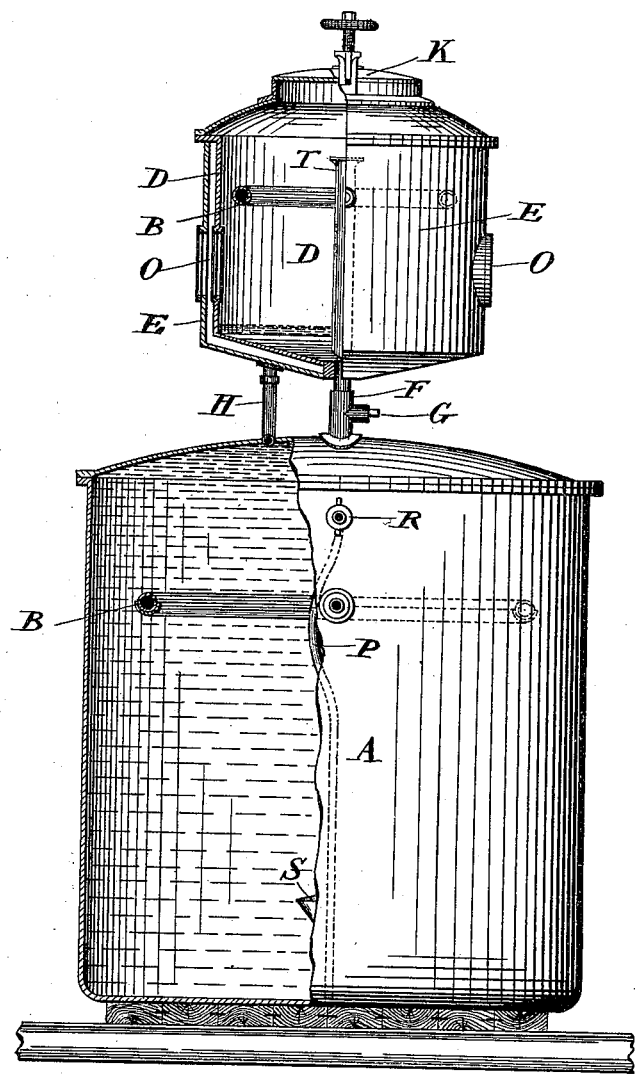

No. 653,387. Patented July 10, 1900.
A. D. W. KING.
APPARATUS FOR TOP FERMENTATION OF BEERS NOT IN VACUO.
(Application filed Dec. 5, 1899.)
(No Model.) 3 Sheets—Sheet 3.
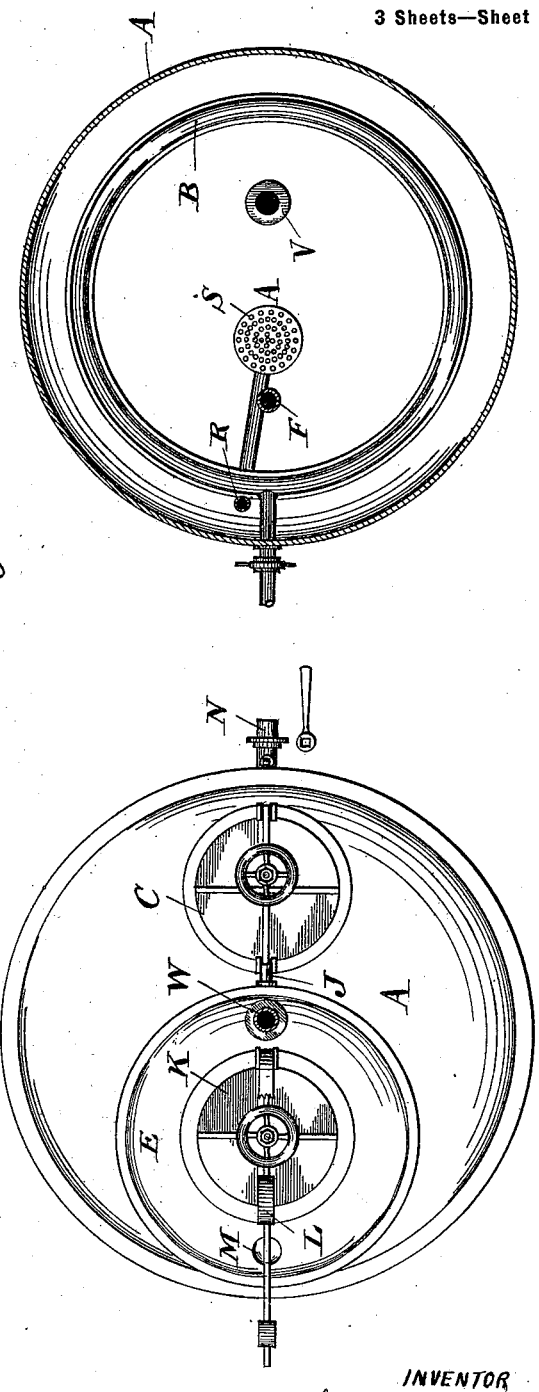
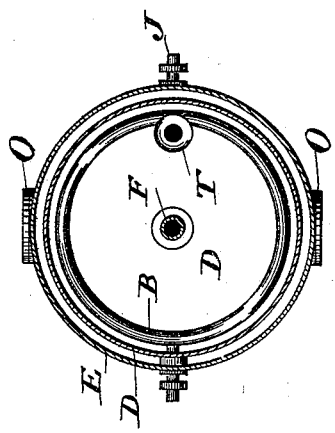
WITNESSES:
INVENTOR
Anthony Duncan Williamson King
ATTORNEYS

United States Patent Office.

ANTHONY DUNCAN WILLIAMSON KING, OF LONDON, ENGLAND, ASSIGNOR OF ONE-HALF TO JAMES HENRY HOWELL, OF BRISTOL, ENGLAND.

APPARATUS FOR TOP FERMENTATION OF BEERS NOT IN VACUO.

SPECIFICATION forming part of Letters Patent No. 653,387, dated July 10, 1900.

Application filed December 5, 1899. Serial No. 739,292. (No model.)

*To all whom it may concern:*

Be it known that I, ANTHONY DUNCAN WILLIAMSON KING, a subject of Her Majesty the Queen of Great Britain, residing at 42 Charleville road, Kensington, London, W., England, have invented a new and useful Improved Apparatus for the Top Fermentation of Beers Not *In Vacuo,* (for which I have applied for patent in Great Britain, No. 22,484, dated November 10, 1899,) of which the following is a specification.

My invention relates to the top fermentation of beer not *in vacuo* and storing the yeast produced; and it comprises the details of structure hereinafter described, and particularly pointed out in the claims.

In order that my said invention and the manner in which I purpose carrying the same into effect and the general construction and arrangement of my improved apparatus employed in the said process may be fully and clearly understood, I have hereunto appended three sheets of drawings, of which—

Figure 1, Sheet 1, is an elevation, partly in section, of a fermenting apparatus. Fig. 2, Sheet 2, is a like elevation taken at right angles to Fig. 1. Fig. 3, Sheet 3, is a plan or top view of same. Fig. 4 is a section taken upon a line A B, Fig. 1, while Fig. 5 is a section taken upon the line C D of the latter figure.

In fermenting beer it is usual to convey the wort from the copper onto or into a refrigerator for reducing the temperature of the wort prior to fermentation, and in the present methods in use such refrigerating or cooling of the wort is carried out in the open air; but provision is made in my apparatus so that the wort shall not come in contact with the atmosphere from the time it leaves the copper until it has passed through the fermenting stage and becomes finished beer and placed in the cask ready for consumption, and indeed it may be so arranged that the beer does not come into contact with atmospheric air until drawn from the cask by the consumer. For the purposes of my invention I therefore employ any form of inclosed refrigerator by means of which the wort may be conveyed by a suitable closed conduit direct from the boiling-copper into the said refrigerator and from the said refrigerator through a suitable closed conduit direct to my improved fermenting apparatus, as hereinafter explained, without coming into contact with the atmospheric air.

My improved fermenting apparatus consists of a preferably-cylindrical air-tight vessel A, (hereinafter referred to as the "fermenting-chamber,") which may be of any dimensions, according to the extent of the brew, and may be made of metal, slate, glass, or other material or combination of materials and provided with an attemperator B for the flow of iced water in the usual way and a manhole or inspection-cover C. Upon the preferably-domed top of the fermenting-chamber is mounted and fixed an air-tight vessel D, (hereinafter referred to as the "yeast vessel,") which may be of metal, slate, or other suitable material, the side wall and bottom of which are incased by a jacket E, the said yeast vessel being in communication with the fermenting-chamber by means of a tubular passage F, the upper end of which is flush, or thereabout, with the bottom of D and extends into and to within a short distance of the bottom of A, the portion between D and A being provided with a cock or tap G. The jacket E of the yeast vessel D is for the passage of a constant flow of iced water, which by preference I arrange to enter at a point H (cock-governed or otherwise) and exhaust at a point J, or vice versa, as may be found most convenient. The said yeast vessel is also provided with an attemperator B for the passage of a flow of iced water, a manhole or inspection-cover K, pressure-gage L, and safety-valve M.

For the most advantageous working of my improved system of top fermentation I conduct the wort (coming, as before stated, through a closed conduit from the closed refrigerator) so that it enters the fermenting-chamber A through a cock-governed passage N, and such flow of cooled wort will continue until the chamber A has become quite full and the wort by passing up through the tube F has risen in the yeast-chamber D to a height of six or seven inches, or thereabout, or to such an extent as will be capable of replacing the wort in A, occasioned by the accumulation of yeast during fermentation, it being an essential condition according to my invention that the chamber A be always full during fermentation process, and in order that the attendant may know when the wort has risen the desired height in the yeast-chamber the latter may be provided with one or more sight-glasses O for this purpose, and when the wort is thereby seen to have attained the desired level in D the attendant will close the cock N and so shut off the supply of wort.

A certain amount of pure yeast having been placed in the fermenting-chamber A and now added to the wort therein, an incipient form of fermentation will now commence, and as I make it an important feature of my invention that the fermentation process be carried out without exposure to the atmosphere in order to exclude possible infection therefrom the air necessary for perfect fermentation I provide by forcing pure filtered sterilized air into the chamber A by means of a pipe P, entering at R and exhausting through a rosette or other screening-surface S into the wort, and upon the rapid fermentation following such entry of sterilized filtered air the head of yeast consequent to such fermentation will as formed rise up in the wort and flow up through a cock-governed passage T, extending high up into the yeast vessel D, and such upward flow of yeast will fall from T into D and such generation and rise of yeast will naturally lower the level of the wort in D, as this flows down through the tube F into A to replace that removed by the generation of the yeast; hence the object of the wort being allowed to rise into D in the first instance, and this action will set up a circulation in the wort which will continue until the time arrived for clearing the beer, when the cock G of the pipe F will be closed the yeast still continuing to rise into the tube T and fall over into the vessel D until fermentation ceases, whereupon the cock of the passage T will be closed and the yeast in D be allowed to remain until needed for further use. The pure beer now in the chamber A may be drawn off through a tap V, and for the purposes of my invention the said beer may pass from V by means of an air-tight conduit direct to the casks or to an intermediate filter, as may be found most convenient, the pressure of carbonic-acid gas ($CO_2$) in the vessel A and chamber D, generated during the fermentation process, serving to force the beer through the said air-tight conduit to the said filter or casks, and such of the carbonic-acid gas generated as may be in excess of that needed for the purposes stated may be drawn off through an outlet W and be stored where convenient for future use in the next operation.

From the foregoing it will be understood that by reason (according to my invention) of the hot wort being conveyed directly from the copper into an inclosed air-tight refrigerator the steam would operate to shield the liquor from atmospheric influence and that by reason of the cooled wort passing from the inclosed refrigerator through a closed conduit to the fermenting-chamber A and from this, when converted into pure beer, by means of an inclosed conduit to the casks or elsewhere the whole process is carried out without the wort or beer at any one time coming in contact with the atmosphere, and, further, that the yeast as formed being collected and stored without contact with the atmosphere may be kept for an almost indefinite period, while the carbonic-acid gas generated may be drawn off and stored for future use instead of wasted, as hitherto; hence the attainment of the objects of my invention.

Having now fully described my invention and the manner in which the same is to be employed for the purposes stated, what I claim, and desire to secure by Letters Patent, is—

1. In combination in an apparatus for the top fermentation of beer not *in vacuo*, and storing the yeast produced, an air-tight vessel A, a beer-inlet pipe leading thereto, an air-tight vessel arranged above the vessel A, a pipe leading from the top of the vessel A up into the other vessel having its discharge end located in the upper part of the same, a pipe leading from the bottom of the upper vessel through the lower vessel having its discharge end near the bottom of the latter, valves in said pipes, an air-pipe discharging into the bottom part of the tank A, a discharge-pipe leading from the bottom of the tank A, a valve controlling the latter, and a pipe leading from the top of the upper chamber, substantially as described.

2. In combination in an apparatus for the top fermentation of beer not *in vacuo*, and storing the yeast produced, an air-tight vessel A, a beer-inlet pipe leading thereto, an air-tight vessel arranged above the vessel A, a pipe leading from the top of the vessel A up into the other vessel having its discharge end located in the upper part of the same, a pipe leading from the bottom of the upper vessel through the lower vessel having its discharge end near the bottom of the latter, valves in said pipes, an air-pipe discharging into the bottom part of the tank A, a discharge-pipe leading from the bottom of the tank A, a valve controlling the latter, and a pipe leading from the top of the upper chamber and an attemperator in each vessel, substantially as described.

In witness whereof I have hereunto set my hand in presence of two witnesses.

ANTHONY DUNCAN WILLIAMSON KING.

Witnesses:
GEORGE THOMAS HYDE,
HENRY CONRAD HEIDE.